United States Patent
Knappe et al.

(10) Patent No.: US 9,551,458 B2
(45) Date of Patent: Jan. 24, 2017

(54) PIVOT BEARING UNIT COMPRISING A BRAKING DEVICE

(75) Inventors: Stefan Knappe, Burghaun (DE); Erhard Lux, Burghaun (DE)

(73) Assignee: Ondal Holding GmbH, Hünfeld (DE)

( * ) Notice: Subject to any disclaimer, the term of this patent is extended or adjusted under 35 U.S.C. 154(b) by 2780 days.

(21) Appl. No.: 10/512,705

(22) PCT Filed: Apr. 29, 2003

(86) PCT No.: PCT/EP03/04452
§ 371 (c)(1),
(2), (4) Date: Apr. 18, 2005

(87) PCT Pub. No.: WO03/093720
PCT Pub. Date: Nov. 13, 2003

(65) Prior Publication Data
US 2005/0282673 A1   Dec. 22, 2005

(30) Foreign Application Priority Data
Apr. 29, 2002 (DE) .................................. 102 19 182

(51) Int. Cl.
*F16H 55/36* (2006.01)
*F16M 13/02* (2006.01)
(Continued)

(52) U.S. Cl.
CPC ........... *F16M 13/027* (2013.01); *F16C 11/103* (2013.01); *F16M 11/06* (2013.01);
(Continued)

(58) Field of Classification Search
CPC ........ F16D 25/044; F16D 63/00; F16D 55/00;
F16D 55/10; F16D 55/12; F16D 55/24; F16D 5/32; F16D 5/34; F16D 5/42; F16D 2125/14; F16M 13/027; F16M 11/06; F16M 11/08; F16M 11/2014; F16C 11/103; F16C 41/001
(Continued)

(56) References Cited

U.S. PATENT DOCUMENTS 3,163,274 A    12/1964   Bowerman et al. ........ 192/88 A
3,757,907 A *  9/1973   Crossman et al. ..... 188/218 XL
(Continued)

FOREIGN PATENT DOCUMENTS

DE    31 00 819 A1    7/1982
DE    3701172         7/1988
(Continued)

*Primary Examiner* — Melody Burch
(74) *Attorney, Agent, or Firm* — Dinsmore & Shohl LLP; Douglas L. Wathen

(57) ABSTRACT

A pivot bearing unit (18), having a pneumatic braking device (21) with a first and second bearing part (22, 23), which are embodied as rotatable relative to one another, wherein the braking device (21) is activatable by means of compressed air (36) via a compressed air supply line (10). The braking device (21) is provided with a brake hose (1), embedded in a bearing plate (14), in the first bearing part (22), and the brake hose (1) expands as a result of subjection to compressed air (36) with a motion (8) in the direction of a free end (16) and, via an axially movable switching ring (2), exerts a force (17) on at least one brake block (6) of the second bearing part (23), for transmitting a braking moment (15) between the first and second bearing parts (22, 23).

30 Claims, 4 Drawing Sheets

(51) Int. Cl.
*F16M 11/06* (2006.01)
*F16M 11/08* (2006.01)
*F16M 11/20* (2006.01)
*F16C 11/10* (2006.01)
*F16D 65/00* (2006.01)
*F16D 55/12* (2006.01)
*F16D 125/14* (2012.01)
*A61G 12/00* (2006.01)
*F16C 41/00* (2006.01)

(52) U.S. Cl.
CPC ......... *F16M 11/08* (2013.01); *F16M 11/2014* (2013.01); *A61G 12/004* (2013.01); *F16C 41/001* (2013.01); *F16D 55/12* (2013.01); *F16D 2125/14* (2013.01)

(58) Field of Classification Search
USPC .................. 188/72.1, 73.1, 151 R, 352, 265; 267/64.11, 64.28; 192/88 A; 248/282.1, 248/289.11, 125.7
See application file for complete search history.

(56) References Cited

U.S. PATENT DOCUMENTS

| | | | | |
|---|---|---|---|---|
| 4,884,670 A | * | 12/1989 | McCormick et al. | 192/150 |
| 5,086,899 A | * | 2/1992 | Latsko | 192/88 B |
| 5,288,277 A | | 2/1994 | Kummerfeld | 474/198 |
| 5,439,083 A | * | 8/1995 | Brock et al. | 192/70.2 |
| 6,022,287 A | * | 2/2000 | Klemen | B60K 6/26 |
| | | | | 180/65.225 |
| 6,070,553 A | * | 6/2000 | Bucker | 119/14.01 |
| 6,095,468 A | * | 8/2000 | Chirico et al. | 248/282.1 |
| 6,578,691 B1 | * | 6/2003 | Ashbrook | 192/88 A |
| 2003/0000793 A1 | * | 1/2003 | Brock et al. | 192/70.28 |

FOREIGN PATENT DOCUMENTS

| | | |
|---|---|---|
| DE | 4212996 | 6/1993 |
| DE | 43 06 805 C1 | 8/1994 |
| DE | 19803929 | 8/1999 |
| EP | 0 614 036 A1 | 9/1994 |
| JP | 58024627 | 2/1983 |
| WO | WO88/05514 | 7/1988 |
| WO | 91/08418 | 6/1991 |

* cited by examiner

PIVOT BEARING UNIT COMPRISING A BRAKING DEVICE

CROSS-REFERENCE

This is the US National Stage of PCT/EP03/04452, filed on Apr. 29, 2003, in Europe, which in turn claims the benefit of priority of invention based on DE 102 19 182.4, filed on Apr. 29, 2002, in Germany, under 35 U.S.C. 119 (a) to (d).

BACKGROUND OF THE INVENTION

The invention relates to a pivot bearing unit, having a pneumatic braking device (21) and a first and second bearing part (22, 23), which are rotatable relative to one another, wherein the braking device (21) is activatable by means of compressed air (36) via a compressed air supply line (10).

Axial pivot bearing units with a braking device for a stabilizing mounting serve the purpose for instance of horizontal pivoting motion of ceiling supply units in medical units in medical technology that are known for instance from German Patent DE 43 06 805 C1. The medical ceiling supply unit is used for moving medical equipment both horizontally and vertically in a room.

BRIEF SUMMARY OF THE INVENTION

The object of the invention is to create a pivot bearing unit of this generic type which has a simple construction and a reliable mode of operation. Moreover, parts subject to wear (brake blocks and brake hose) are to be easy to replace without dismantling supply lines.

This object and others, which will be made more apparent hereinafter, are attained in a pivot bearing unit, having a pneumatic braking device and a first and second bearing part that are rotatable relative to each other, wherein the braking device is activated by compressed air via a compressed air supply line.

According to the invention the braking device includes a brake hose embedded in a bearing plate in the first bearing part, which expands as a result of activation by the compressed air with a motion in the direction of a free end and, via an axially movable switching ring, exerts a force on at least one brake block of the second bearing part in order to transmit a braking moment between the first and second bearing parts.

The invention will be described in further detail in terms of an exemplary embodiment.

BRIEF DESCRIPTION OF THE DRAWING

The objects, features and advantages of the invention will now be illustrated in more detail with the aid of the following description of the exemplary embodiment, with reference to the accompanying figures.

Shown are.

DESCRIPTION OF THE PREFFERED EMBODIMENT

Figure 1:
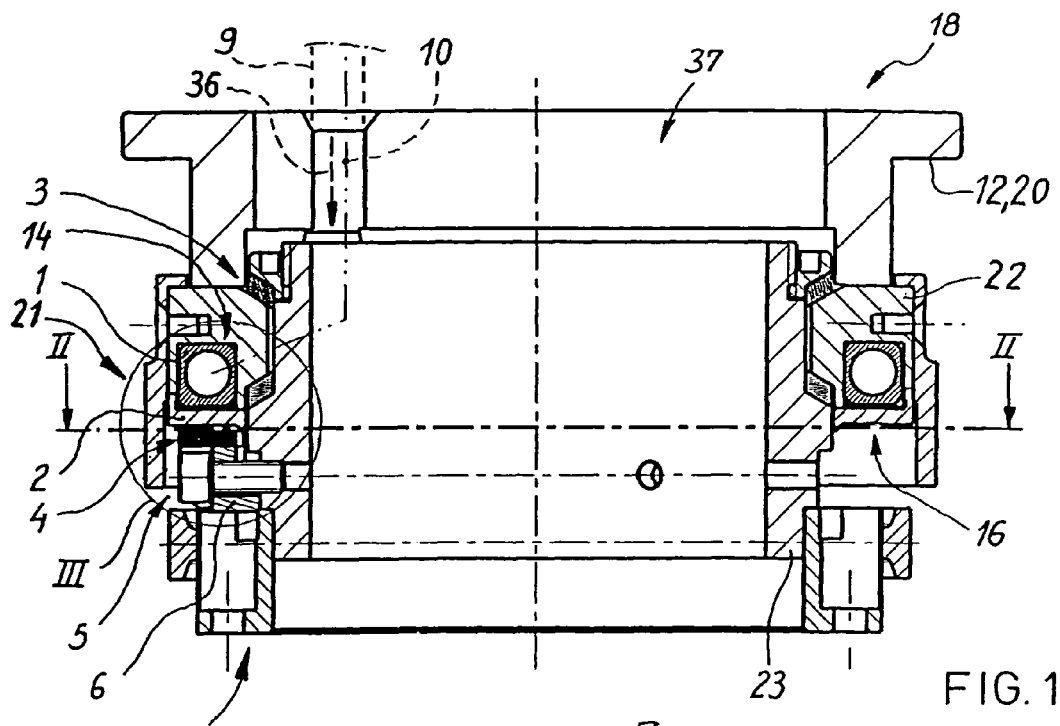
FIG. 1, in an axial sectional view, a pivot bearing unit in a section taken along the line I-I of FIG. 2.

FIG. 1 shows a pivot bearing unit 18 with a first and second bearing part 22, 23, which are embodied as rotatable relative to one another. For braking or fixing a rotary angle, once set, of the two bearing parts 22, 23 relative to one another, the pivot bearing unit 18 is provided with a pneumatic braking device 21, which can be activated by means of compressed air 36 via compressed air supply line 10. In the first bearing part 22, the braking device 21 is provided with a brake hose 1, embedded in a bearing plate 14, and upon subjection to compressed air 36 the brake hose 1 expands, with a motion 8 in the direction of a free side 16 (FIG. 5) and, via an axially movable switching ring 2, exerts a force 17 on at least one brake block 6 of the second bearing part 23, for transmitting a braking moment 15 between the first and second bearing parts 22, 23, The brake block 6 is screwed firmly to the bearing pot 13. The switching ring 2, once compressed air 36 has been directed into the break hose 1, presses on the brake lining 4, which is glued to the brake block 6 that is made of aluminum. The brake lining 4 comprises a plastic, for instance the kind that can be procured from the company known as Jurid.

As the brake hose 1, a rubber hose cut to the proper length is contemplated; a first end is sealed off by means of a stopper, and a second end is provided with a glued-in connection valve (not shown) for the compressed air supply line 10. This brake hose 1 is placed like a ring in the bearing plate 14. The compressed air supply line 10 is passed through the bearing plate 14 for mounting on the ceiling. Because the brake hose 1 has a rectangular outer shape, on the one hand a good seat in the bearing plate 14, which is complementary to it, and on the other a more two-dimensional transmission of force to the switching ring 2 are provided for.

Figure 6:
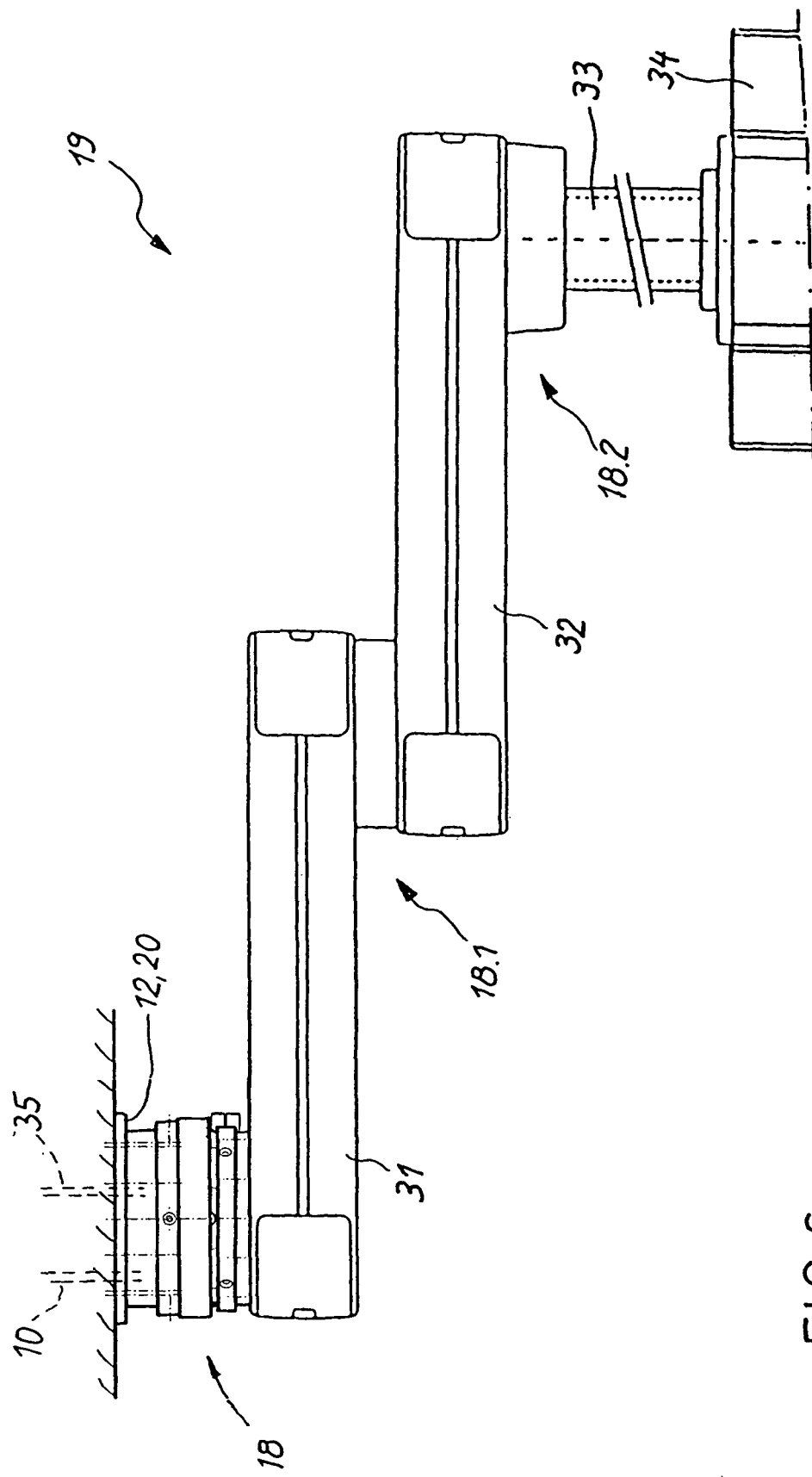
FIG. 6, in a side view, one example of an application, with a ceiling-mounted stabilizing mounting.

The bearing pot 13 is used for mounting or securing a stabilizing mounting arm 31, 32, which is to be pivoted, or a stabilizing mounting column 33. For ducting lines (compressed air supply lines 10, electrical lines 35), the first bearing part 22 has a central opening 37, and the second bearing part 23 is designed as a bearing pot 13. The mounting is done by means of conventional screw fasteners. The flow of force is from the annular securing device 12 via the oblique needle bearing 3 to the bearing pot 13. To assure that the stabilizing mounting arms 31, 32 cannot move horizontally without being controlled, one braking device 21 each is built in. Later mounting or removal of components of the braking device 21 is possible at any time without removal of a piece of medical equipment 34 (FIG. 6). Thus the otherwise usual removal of gas lines 9 or compressed air supply lines 10 and electrical supply lines 35 becomes unnecessary.

By means of a plastic compressed air supply line 10, compressed air 36 is introduced into the brake hose 1. This is done after actuation of a pneumatic valve (not shown), for instance with a manual actuation in which the brake hose 1 is pumped up and expands in the process. In this process, the brake hose 1 moves the switching ring 2 downward by means of a linear motion 8. Because of a positive-engagement connection with the bearing plate 14, a radial motion 11 of the switching ring 2 during the linear motion 8 is impossible.

The linear motion 8 of the switching ring 2 is limited by the brake blocks 6. The switching ring 2 is seated on the brake linings 4 and generates a braking moment 15. The setting and adjustment of the braking moment 15 are effected by means of threaded pins 7, by which the brake block 6 is raised by a linear motion 8 and fixed with a screw connection 5. By providing a number of brake blocks 6 greater than three, influence can also be exerted on the braking moment 15.

Figure 3:
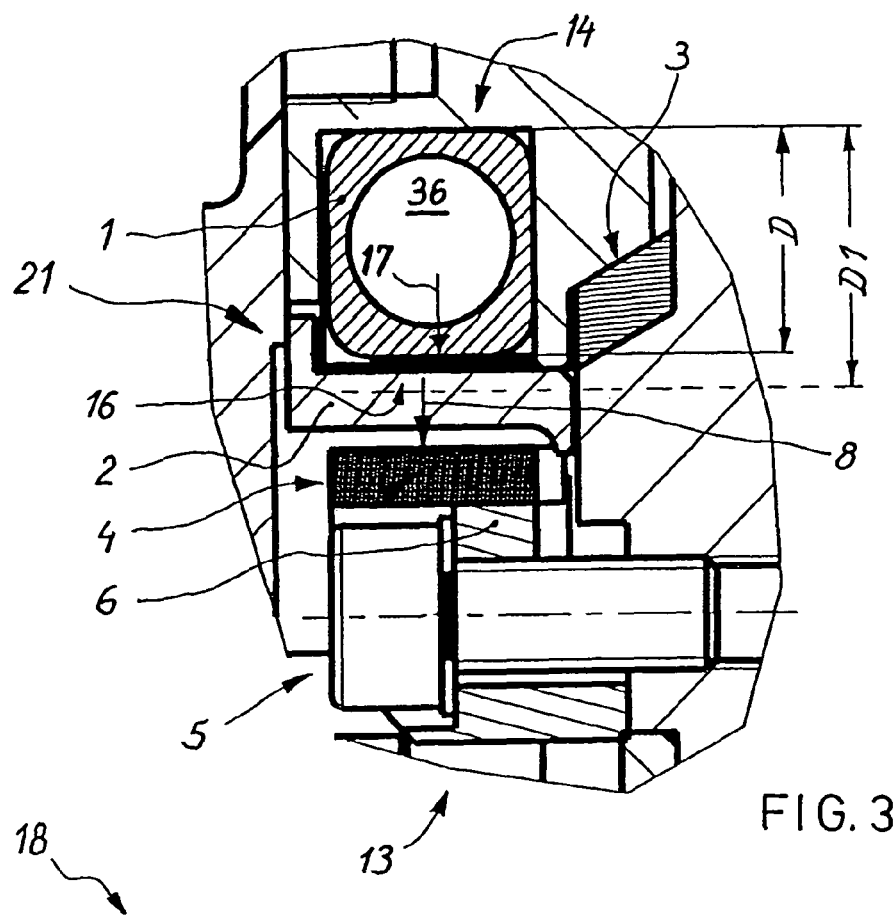
FIG. 3, a detail marked III in FIG. 1, showing more detail of a braking device in an inactive state.

The brake hose 1, 10 is vented by blowing out the compressed air 36, by actuation of a pneumatic valve (not shown). This state is shown in FIGS. 1 and 3. The switching ring 2 moves linearly upward. The pressure on the brake blocks 6 is rescinded, and the braking device 21 is thus ventilated and deactivated.

Permanent braking by means of friction is possible without structural conversion. This becomes important if the compressed air supply is not structurally provided for. For that purpose, the brake blocks 6 are raised by means of threaded pins 7 and fixed by a screw connection 5. Now the switching ring 2 has permanent contact with the brake lining 4 of the brake block 6, as a result of which a frictional braking moment 15 is generated. By means of this construction, wear of the brake hose 1 from friction is avoided.

Wearing parts such as the brake hose 1 and brake blocks 6 can advantageously be replaced without removing the supply lines (electrical and gas supply).

Figure 2:
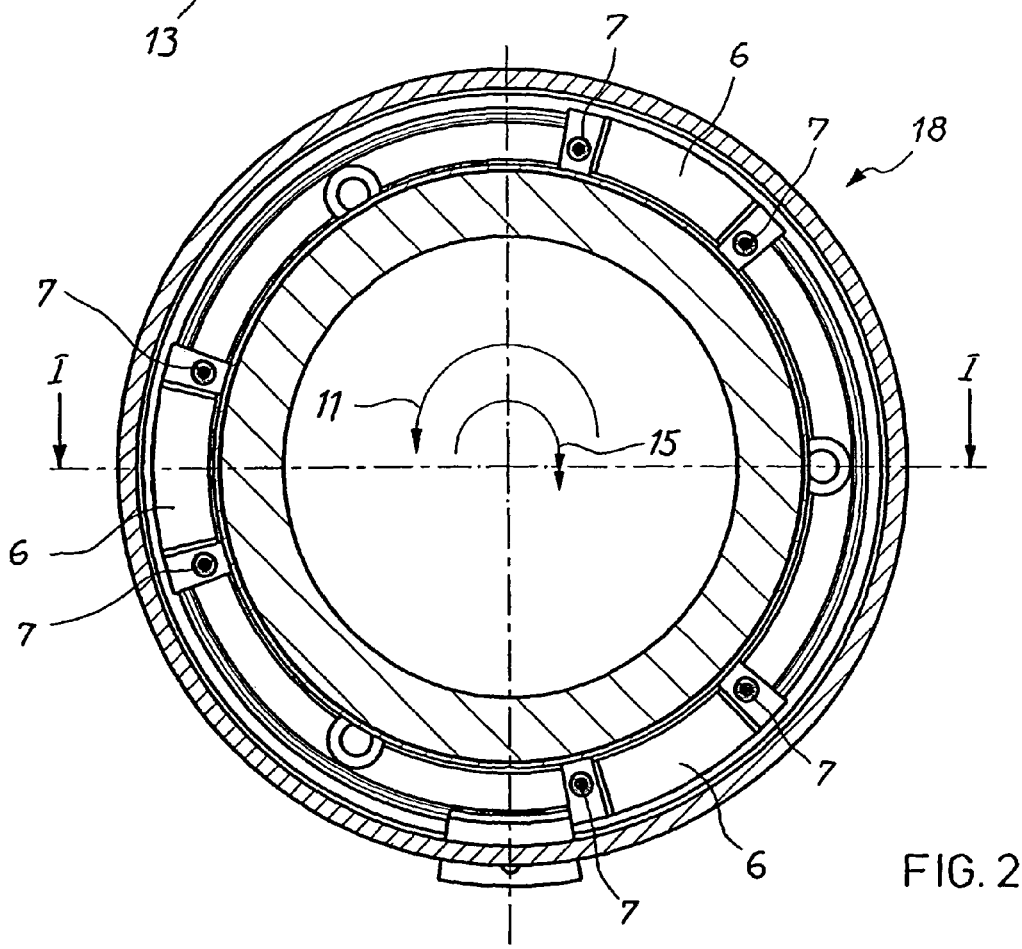
FIG. 2, in a sectional view, the pivot bearing unit in a section taken along the line II-II of FIG. 1.

FIG. 2, in a sectional view, shows the pivot bearing unit 18 taken along the line II-II of FIG. 1.

Figure 5:
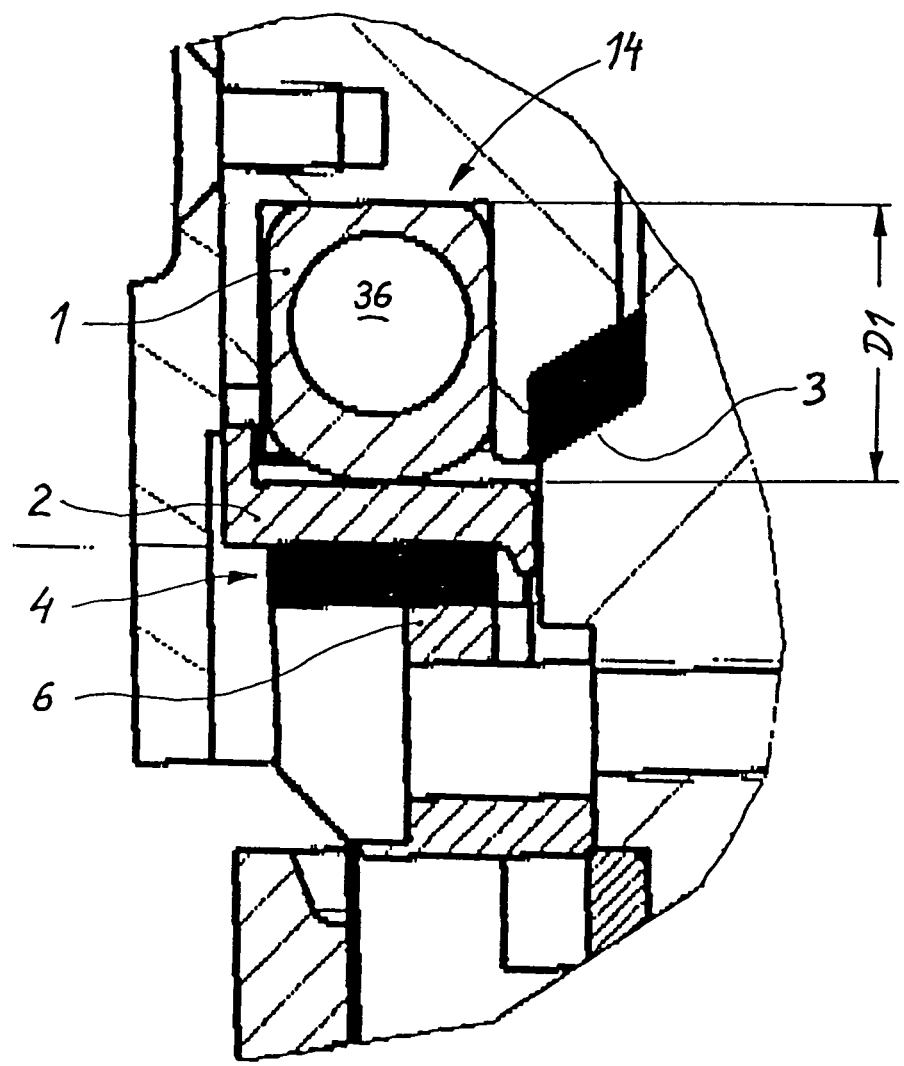
FIG. 5, the detail III of FIG. 3, but with the braking device in the activated state.

FIG. 3 shows a detail III of FIG. 1, showing the braking device 21 in further detail in an inactive state. The brake hose 1 is embedded on three sides and can thus expand solely in the direction of the free end 16 (FIG. 5). As a consequence, a first spacing D increases to a second spacing D1, and a force 17 is thus exerted on the switching ring 2. The brake hose 1 in this process acts like a pneumatic short-stroke cylinder.

Figure 4:
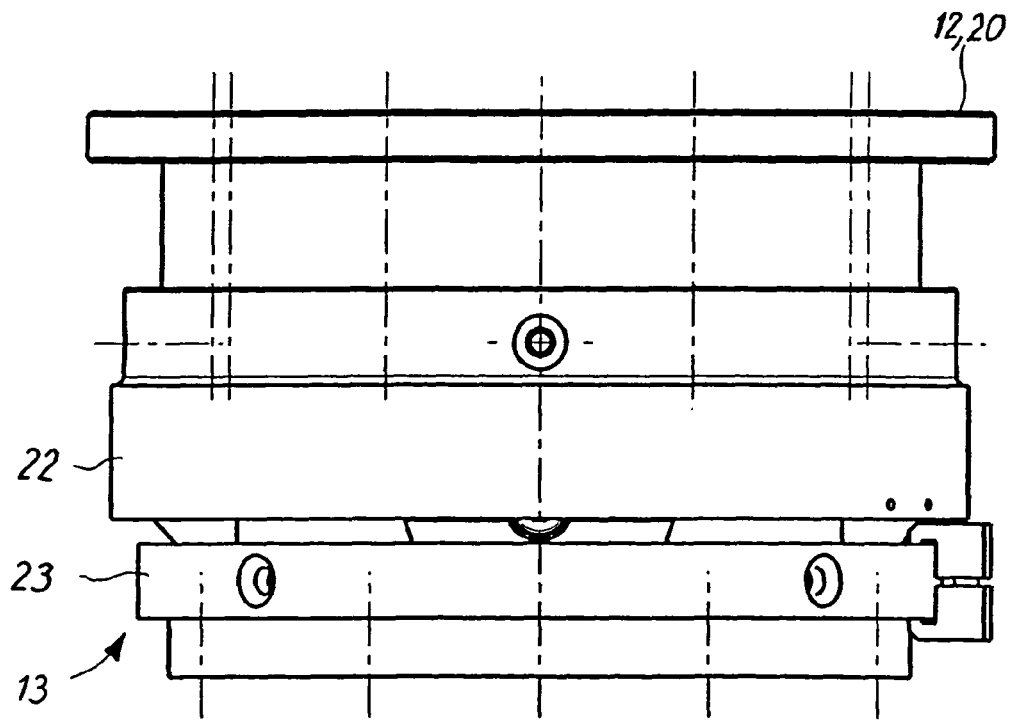
FIG. 4, in a side view, the pivot bearing unit of FIG. 1.

FIG. 4 is a side view of the pivot bearing unit 18 of FIG. 1.

FIG. 5 shows the detail III of FIG. 3, but with the braking device 21 in the activated state as a result of the brake hose 1 that has expanded by means of the compressed air 36.

In FIG. 6, the pivot bearing unit 18 is provided for a stabilizing mounting 19, in particular a ceiling-mounted stabilizing mounting 19; a flange plate 20 is provided as the securing device 12 for a ceiling fastening. The ceiling-mounted stabilizing mounting 19 has a first and second stabilizing mounting arm 31, 32, each with a further pivot bearing unit 18.1 and 18.2, respectively, which are partly accommodated inside the stabilizing mounting arms 31, 32. Through a compressed air supply line 10 shown in dashed lines, compressed air 36 (5 bar) is introduced by distribution into the respective brake hose 1, or separate compressed air supply lines 10 are provided for each of the three brake hoses 1 of the pivot bearing units 18, 18.1, 18.2.

LIST OF REFERENCE NUMERALS

1 Brake hose
2 Switching ring
3 Oblique needle bearing
4 Brake lining
5 Screw connection
6 Brake block
7 Threaded pin
8 Linear motion
9 Plastic hose
10 Compressed air supply line
11 Radial motion
12 Securing device
13 Bearing pot
14 Bearing plate
15 Braking moment
16 Free side
17 Force
18 Pivot bearing unit
19 Ceiling-mounted tripod
20 Flange plate
21 Braking device
22 First bearing part
23 Second bearing part
31 First tripod arm
32 Second tripod arm
33 Tripod column
34 Equipment
35 Electrical line
36 Compressed air
37 Central opening
D First spacing
D1 Second spacing

The invention claimed is:

1. A pivot bearing unit, comprising:
a first bearing part having an axial central opening generally defining a bearing axis, the first bearing part having a bearing plate with a annular groove defined therein, the annular groove having a generally rectangular cross sectional shape with an open side;
a brake hose disposed in the annular groove of the first bearing part, the brake hose having a generally rectangular cross sectional shape complementary to the annular groove, the brake hose having a free side at the open side of the groove, the brake hose being inflatable from an inactive state in which the free side is generally flat to an activated state in which the free side expands along the bearing axis;
a second bearing part interconnected with the first bearing part for rotation about the bearing axis;
a brake block connected to the second bearing part, the brake block being axially adjustable to a plurality of positions along the bearing axis with respect to the second bearing part;
an adjusting structure operable to axially adjust the brake block;
a fixing structure fixing the brake block in any one of the plurality of positions;
an axially movable switching ring disposed at the open side of the annular groove such that the axially movable switching ring is moved axially away from the open side of the annular groove when the brake hose in the activated state expands the free side along the bearing axis;
a brake lining disposed between the brake block and the axially movable switching ring;
whereby expansion of the free side of the brake hose in the activate state pushes the axially movable switching ring into braking engagement with the brake lining and brake block, thereby locking the second bearing part relative to the first bearing part.

2. The pivoting bearing unit of claim 1, wherein the second bearing part extends through the axial central opening of the first bearing part and has bearings engaging an upper and lower surface of the first bearing part.

3. The pivoting bearing unit of claim 1, wherein the brake hose is substantially entirely disposed within the groove when in the inactive state, the free side of the brake hose not extending past a lower edge of the first bearing part in the inactive state.

4. The pivoting bearing unit of claim 1, wherein the brake hose is generally square and has a generally round central passage in the inactive state.

5. The pivoting bearing unit of claim 1, wherein the axially movable switching ring consists of a single switching ring disposed between the first bearing part and second bearing part.

6. The pivoting bearing unit of claim 1, wherein the brake block comprises a plurality of spaced apart brake blocks and the brake lining comprises a plurality of brake linings.

7. The pivoting bearing unit of claim 1, wherein the pivot bearing unit is configured for pivotally mounting a support arm to a ceiling, the support arm affixed to the second bearing part.

8. The pivoting bearing unit of claim 7, further comprising a flange plate for securing the pivot bearing unit to the ceiling.

9. The pivoting bearing unit of claim 1, further comprising at least one support arm for supporting medical equipment.

10. A pivot bearing unit, comprising:
a first bearing part having an axial central opening generally defining a bearing axis, the first bearing part having a bearing plate with a annular groove defined therein, the annular groove having a generally rectangular cross sectional shape with an open side;
a brake hose disposed in the annular groove of the first bearing part, the brake hose having a generally rectangular cross sectional shape complementary to the annular groove, the brake hose having a free side at the open side of the groove, the brake hose being inflatable from an inactive state in which the free side is generally flat to an activated state in which the free side expands along the bearing axis;
a second bearing part interconnected with the first bearing part for rotation about the bearing axis, the second bearing part extending through the axial central opening of the first bearing part and having bearings engaging an upper and lower surface of the first bearing part, the bearings directly supporting rotation of the second bearing part about the bearing axis;
a brake block connected to the second bearing part;
an axially movable switching ring disposed at the open side of the annular groove such that the axially movable switching ring is moved axially away from the open side of the annular groove when the brake hose in the activated state expands the free side along the bearing axis;
a brake lining disposed between the brake block and the axially movable switching ring;
whereby expansion of the free side of the brake hose in the activate state pushes the axially movable switching ring into braking engagement with the brake lining and brake block, thereby locking the second bearing part relative to the first bearing part.

11. The pivoting bearing unit of claim 10, wherein the brake hose is substantially entirely disposed within the groove when in the inactive state, the free side of the brake hose not extending past a lower edge of the first bearing part in the inactive state.

12. The pivoting bearing unit of claim 10, wherein the brake hose is generally square and has a generally round central passage in the inactive state.

13. The pivoting bearing unit of claim 10, wherein the axially movable switching ring consists of a single switching ring disposed between the first bearing part and second bearing part.

14. The pivoting bearing unit of claim 10, wherein the brake block comprises a plurality of spaced apart brake blocks and the brake lining comprises a plurality of brake linings.

15. The pivoting bearing unit of claim 10, wherein the pivot bearing unit is configured for pivotally mounting a support arm to a ceiling, the support arm affixed to the second bearing part.

16. The pivoting bearing unit of claim 15, further comprising a flange plate for securing the pivot bearing unit to the ceiling.

17. The pivoting bearing unit of claim 10, further comprising at least one support arm for supporting medical equipment.

18. A pivot bearing unit, comprising:
a first bearing part having an axial central opening generally defining a bearing axis, the first bearing part having a bearing plate with a annular groove defined therein, the annular groove having an open side;
a brake hose disposed in the annular groove of the first bearing part, the brake hose having a free side at the open side of the groove, the brake hose being inflatable from an inactive state to an activated state in which the free side expands along the bearing axis;
a second bearing part interconnected with the first bearing part for rotation about the bearing axis;
a brake block connected to the second bearing part, the brake block being axially adjustable to a plurality of positions along the bearing axis with respect to the second bearing part;
an adjusting structure operable to axially adjust the brake block;
a fixing structure fixing the brake block in any one of the plurality of positions;
an axially movable switching ring disposed at the open side of the annular groove such that the axially movable switching ring is moved axially away from the open side of the annular groove when the brake hose in the activated state expands the free side along the bearing axis;
a brake lining disposed between the brake block and the axially movable switching ring;
whereby expansion of the free side of the brake hose in the activate state pushes the axially movable switching ring into braking engagement with the brake lining and brake block, thereby locking the second bearing part relative to the first bearing part.

19. The pivoting bearing unit of claim 18, wherein the second bearing part extends through the axial central opening of the first bearing part and has bearings engaging an upper and lower surface of the first bearing part.

20. The pivoting bearing unit of claim 18, wherein the axially movable switching ring consists of a single switching ring disposed between the first bearing part and second bearing part.

21. The pivoting bearing unit of claim 18, wherein the brake block comprises a plurality of spaced apart brake blocks and the brake lining comprises a plurality of brake linings.

22. The pivoting bearing unit of claim 18, wherein the pivot bearing unit is configured for pivotally mounting a support arm to a ceiling, the support arm affixed to the second bearing part.

23. The pivoting bearing unit of claim 22, further comprising a flange plate for securing the pivot bearing unit to the ceiling.

24. The pivoting bearing unit of claim 18, further comprising at least one support arm for supporting medical equipment.

25. A pivot bearing unit, comprising:
- a first bearing part having an axial central opening generally defining a bearing axis, the first bearing part having a bearing plate with a annular groove defined therein, the annular groove having an open side;
- a brake hose disposed in the annular groove of the first bearing part, the brake hose having a free side at the open side of the groove, the brake hose being inflatable from an inactive state to an activated state in which the free side expands along the bearing axis;
- a second bearing part interconnected with the first bearing part for rotation about the bearing axis, the second bearing part extending through the axial central opening of the first bearing part and having bearings engaging an upper and lower surface of the first bearing part, the bearings directly supporting rotation of the second bearing part about the bearing axis;
- a brake block connected to the second bearing part;
- an axially movable switching ring disposed at the open side of the annular groove such that the axially movable switching ring is moved axially away from the open side of the annular groove when the brake hose in the activated state expands the free side along the bearing axis;
- a brake lining disposed between the brake block and the axially movable switching ring;
- whereby expansion of the free side of the brake hose in the activate state pushes the axially movable switching ring into braking engagement with the brake lining and brake block, thereby locking the second bearing part relative to the first bearing part.

26. The pivoting bearing unit of claim 25, wherein the axially movable switching ring consists of a single switching ring disposed between the first bearing part and second bearing part.

27. The pivoting bearing unit of claim 25, wherein the brake block comprises a plurality of spaced apart brake blocks and the brake lining comprises a plurality of brake linings.

28. The pivoting bearing unit of claim 25, wherein the pivot bearing unit is configured for pivotally mounting a support arm to a ceiling, the support arm affixed to the second bearing part.

29. The pivoting bearing unit of claim 28, further comprising a flange plate for securing the pivot bearing unit to the ceiling.

30. The pivoting bearing unit of claim 25, further comprising at least one support arm for supporting medical equipment.

* * * * *